(12) United States Patent
Aoyama et al.

(10) Patent No.: US 8,472,975 B2
(45) Date of Patent: Jun. 25, 2013

(54) POSITIONING SUPPORT DEVICE AND POSITIONING SUPPORT METHOD

(75) Inventors: Shinya Aoyama, Yokosuka (JP); Ken Uchiyama, Yokohama (JP); Tomomi Tanaka, Kawasaki (JP); Takuya Inoue, Chiba (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/145,913

(22) PCT Filed: Jan. 22, 2010

(86) PCT No.: PCT/JP2010/050820
§ 371 (c)(1),
(2), (4) Date: Aug. 26, 2011

(87) PCT Pub. No.: WO2010/084959
PCT Pub. Date: Jul. 29, 2010

(65) Prior Publication Data
US 2011/0306356 A1    Dec. 15, 2011

(30) Foreign Application Priority Data
Jan. 23, 2009   (JP) ................. P2009-012723

(51) Int. Cl.
*H04W 88/02*   (2009.01)
(52) U.S. Cl.
USPC ........................................... 455/456.1
(58) Field of Classification Search
USPC ............. 455/456.1, 456.2, 456.3, 418, 404.2, 455/436; 709/204, 206, 245; 463/42
See application file for complete search history.

(56) References Cited

U.S. PATENT DOCUMENTS

| 2004/0029583 | A1  | 2/2004 | Yamamoto et al. |
| 2005/0192029 | A1* | 9/2005 | Aigner et al. ............ 455/456.5 |
| 2007/0100549 | A1  | 5/2007 | Kawakami et al. |
| 2008/0076420 | A1* | 3/2008 | Khetawat et al. .......... 455/435.1 |

(Continued)

FOREIGN PATENT DOCUMENTS

| JP | 2002 195846 | 7/2002 |
| JP | 2002 221563 | 8/2002 |

(Continued)

OTHER PUBLICATIONS

International Preliminary Report on Patentability and Written Opinion issued Aug. 18, 2011 in PCT /JP2010/050820.

(Continued)

*Primary Examiner* — Diane Mizrahi
(74) *Attorney, Agent, or Firm* — Oblon, Spivak, McClelland, Maier & Neustadt, L.L.P.

(57) ABSTRACT

Highly-accurate approximate positional information is transmitted to a communication terminal. An approximate positional information database of a server included in a positioning support system includes approximate positional information used for positioning calculation at the communication terminal and which indicates a position of a cell in which the communication terminal is located and a cell identifier identifying the cell, with approximate positional information and the cell being associated with each other. Based on a positioning information transmission request which includes a cell and which is transmitted from the communication terminal, approximate positional information stored in the approximate positional information database is acquired and transmitted from a communication unit to the communication terminal. Positioning result information indicating a result of the positioning calculation transmitted from the communication terminal is received and, based on this information, approximate positional information stored in the approximate positional information database is updated by a control unit. The accuracy of approximate positional information is enhanced due to the approximate positional information stored in the approximate positional information database being updated based on positioning result information.

8 Claims, 12 Drawing Sheets

| MCC | MNC | SGSN IP ADDRESS | INQUIRY TO GMLC | Lat | Lon | Alt | Unc | Unc-Alt |
|---|---|---|---|---|---|---|---|---|
| COUNTRY CODE | OPERATOR CODE | SGSN IP ADDRESS | | LATITUDE (Y) | LONGITUDE (X) | HEIGHT FROM WGS84 ELLIPSOID | UNCERTAINTY OF LATITUDE AND LONGITUDE | UNCERTAINTY OF ALTITUDE |
| XXX | YYY | | × | N89.99999 | W000.00001 | +10 | 60 | 60 |
| | | xxx.xxx.xxx.111 | — | N89.99999 | W000.00001 | +10 | 10 | 10 |
| | | xxx.xxx.xxx.222 | — | N88.00000 | W001.00001 | +10 | 10 | 10 |
| | ZZZ | | ○ | N88.55555 | W000.15000 | +10 | 80 | 60 |
| ... | ... | ... | ... | ... | ... | ... | ... | ... |

FOREIGN PATENT DOCUMENTS

| | | |
|---|---|---|
| JP | 2002 296339 | 10/2002 |
| JP | 2005 086629 | 3/2005 |
| JP | 2005 249611 | 9/2005 |
| JP | 2005 265552 | 9/2005 |
| JP | 2007 027909 | 2/2007 |
| WO | WO 2006/022324 A1 | 3/2006 |
| WO | WO 2008/025013 A2 | 2/2008 |

OTHER PUBLICATIONS

Japanese Office Action issued Apr. 24, 2012, in Patent Application No. 2009-012723 (with English-language translation).

International Search Report issued Feb. 23, 2010 in PCT/JP10/050820 filed Jan. 22, 2010.

Office Action issued Oct. 17, 2012 in Chinese Patent Application No. 201080005256.1 (with English-language translation).

Japanese Office Action issued Dec. 13, 2012, in Japan Patent Application No. 2009-012723 (with English translation).

Office Action issued Apr. 9, 2013, in Japanese Patent Application No. 2009-012723, filed Jan. 23, 2009 (with English-language Translation).

\* cited by examiner

Fig.4

| MCC | MNC | Cell ID | Lat | Lon | Alt | Unc | Unc-Alt | UPDATE NECESSITY |
|---|---|---|---|---|---|---|---|---|
| COUNTRY CODE | OPERATOR CODE | CELL ID | LATITUDE (Y) | LONGITUDE (X) | HEIGHT FROM WGS84 ELLIPSOID | UNCERTAINTY OF LATITUDE AND LONGITUDE | UNCERTAINTY OF ALTITUDE | |
| XXX | YYY | 111 | N89.99999 | W000.00001 | +10 | 10 | 10 | NECESSARY |
| ... | ... | ... | ... | ... | ... | ... | ... | ... |

Fig.5

| MCC | MNC | SGSN IP ADDRESS | Lat | Lon | Alt | Unc | Unc-Alt |
|---|---|---|---|---|---|---|---|
| COUNTRY CODE | OPERATOR CODE | SGSN IP ADDRESS | LATITUDE (Y) | LONGITUDE (X) | HEIGHT FROM WGS84 ELLIPSOID | UNCERTAINTY OF LATITUDE AND LONGITUDE | UNCERTAINTY OF ALTITUDE |
| XXX | YYY | xxx.xxx.xxx.111 | N89.99999 | W000.00001 | +10 | 10 | 10 |
| ... | ... | ... | ... | ... | ... | ... | ... |

Fig.6

| MCC | MNC | SGSN IP ADDRESS | INQUIRY TO GMLC | Lat | Lon | Alt | Unc | Unc-Alt |
|---|---|---|---|---|---|---|---|---|
| COUNTRY CODE | OPERATOR CODE | SGSN IP ADDRESS | | LATITUDE (Y) | LONGITUDE (X) | HEIGHT FROM WGS84 ELLIPSOID | UNCERTAINTY OF LATITUDE AND LONGITUDE | UNCERTAINTY OF ALTITUDE |
| XXX | YYY | | × | N89.99999 | W000.00001 | +10 | 60 | 60 |
| | | xxx.xxx.xxx.111 | — | N89.99999 | W000.00001 | +10 | 10 | 10 |
| | | xxx.xxx.xxx.222 | — | N88.00000 | W001.00001 | +10 | 10 | 10 |
| | ZZZ | | ○ | N88.55555 | W000.15000 | | | 60 |
| ... | ... | ... | ... | ... | ... | ... | ... | ... |

POSITIONING SUPPORT DEVICE AND POSITIONING SUPPORT METHOD

TECHNICAL FIELD

The present invention relates to a positioning support device which transmits approximate positional information used as assistance data during positioning calculation by a communication terminal, and a positioning support method by the positioning support device.

BACKGROUND ART

With technical advancements in communication terminals such as mobile phones, communication terminals having a positioning function using GPS (Global Positioning System) are becoming popular. When performing a positioning calculation using GPS with a communication terminal, with a single point positioning method in which positioning is performed by only receiving radio waves from a GPS satellite, there are concerns over an increase in positioning time, an increase in power consumption by the communication terminal, and the like. Therefore, a network-assisted method is adopted which reduces positioning time by transmitting acquisition information of a position of a GPS satellite or the like (assistance data) from a positioning support server to a communication terminal (for example, refer to Patent Document 1).

In addition, with GPS positioning by the network-assisted method described above, as information indicating a general position of a communication terminal (approximate positional information), information identifying a position of a base station of an area in which the communication terminal exists is transmitted from the positioning support server to the communication terminal as one type of assistance data. The approximate positional information of the communication terminal refers to information that contributes significantly to a success rate of GPS positioning.

CITATION LIST

Patent Literature

PATENT DOCUMENT 1: Japanese Patent Application Laid-Open No. 2005-86629

SUMMARY OF INVENTION

Technical Problem

However, in a case where a base station of a network in which a communication terminal exists does not belong to the communication terminal's own network such as when the communication terminal roams out to an overseas mobile communication network, a positioning support server may not be aware of information that identifies a position of the base station of the network in which the communication terminal exists. In this case, since the positioning support server calculates approximate positional information from limited information such as information which is transmitted from the communication terminal and which specifies a country in which the communication terminal exists and transmits the calculated approximate positional information to the communication terminal, accuracy of the approximate positional information declines. Therefore, there is a problem in that the success rate of GPS positioning by the communication terminal declines.

The present invention has been made in consideration of the above, and an object thereof is to provide a positioning support device which transmits highly-accurate approximate positional information to a communication terminal and a positioning support method by the positioning support device.

Solution to Problem

In order to achieve the object described above, a positioning support device according to the present invention comprises: approximate positional information storage unit for storing approximate positional information which is used for positioning calculation of a communication terminal and which indicates a position of a cell where the communication terminal exists and information identifying the cell, after associating the approximate positional information with the information identifying the cell; approximate positional information transmitting unit for, based on a positioning information transmission request which includes the information identifying the cell where the communication terminal exists and which is transmitted from the communication terminal, acquiring the approximate positional information stored in the approximate positional information storage unit in association with the information identifying the cell where the communication terminal exists, and transmitting the approximate positional information to the communication terminal; positioning result receiving unit for receiving positioning result information which is information transmitted from the communication terminal and which indicates a result of the positioning calculation; and approximate positional information updating unit for updating the approximate positional information stored in the approximate positional information storage unit based on the positioning result information.

According to the positioning support device described above, positioning result information transmitted from the communication terminal is received, and based on the positioning result information, approximate positional information which is stored in the approximate positional information storage unit and which indicates a position of a cell is updated. In this manner, since updating of the approximate positional information based on actual results of positioning by a communication terminal in the same cell enables increased accuracy of approximate positional information related to the position of the cell, approximate positional information with higher accuracy can be transmitted to the communication terminal.

In this case, a mode of the positioning result receiving unit may be adopted in which the positioning result receiving unit receives the positioning result information transmitted from the communication terminal to which the approximate positional information has been transmitted from the approximate positional information transmitting unit.

As described above, by adopting a mode in which positioning result information transmitted from the communication terminal to which the approximate positional information had been transmitted is received, a result of positioning performed using approximate positional information transmitted to the communication terminal is reflected to enable the accuracy of the approximate positional information stored in the approximate positional information storage unit to be maintained more appropriately.

In this case, configurations that more effectively realize the effect described above specifically include a mode in which the approximate positional information is information that identifies a position of a base station related to the cell and the approximate positional information and the positioning result information are information that includes latitude and longitude.

In addition, a mode of the positioning support device according to the present invention may be adopted in which the approximate positional information updating unit calculates new approximate positional information based on a position identified by the approximate positional information transmitted to the communication terminal and on a position identified by the positioning result information.

As described above, by calculating new approximate positional information based on a position identified by the approximate positional information transmitted to the communication terminal and on a position identified by the positioning result information, approximate positional information that is more appropriate and highly accurate is newly calculated.

In this case, a mode of the approximate positional information updating unit may be adopted in which a point midway between the position identified by the approximate positional information transmitted to the communication terminal and the position identified by the positioning result information is set as new approximate positional information.

As described above, when the point midway between the position identified by the approximate positional information transmitted to the communication terminal and the position identified by the positioning result information is set as new approximate positional information, the amount of processing related to calculating the new approximate positional information is small. Therefore, positioning can be performed at high accuracy and, at the same time, the period of time required for processing related to positioning can be reduced.

Furthermore, a mode may be adopted in which the approximate positional information storage unit stores, in association with the approximate positional information, a flag indicating an update necessity of the approximate positional information, and the approximate positional information updating unit updates the approximate positional information when determination is made that updating of the approximate positional information is necessary based on the flag.

When the approximate positional information stored in the approximate positional information storage unit is accurate information, the accuracy of the approximate positional information may actually decline as a result of updating performed based on a positioning result by the communication terminal. Therefore, by storing a flag indicating an update necessity in association with approximate positional information, a decline in the accuracy of the approximate positional information can be prevented.

Moreover, in addition to being describable as an invention of a positioning support device as presented above, the present invention can also be described as a positioning support method as presented below. This is substantially the same invention albeit belonging to different categories and has similar operational effects.

Specifically, a positioning support method according to the present invention is employed by a positioning support device including approximate positional information storage unit for storing approximate positional information which is used for positioning calculation of a communication terminal and which indicates a position of a cell where the communication terminal exists and information identifying the cell, after associating the approximate positional information with the information identifying the cell, the positioning support method including: an approximate positional information transmission step of acquiring the approximate positional information stored in the approximate positional information storage unit in association with information identifying a cell where the communication terminal exists and transmitting the approximate positional information by approximate positional information transmitting unit to the communication terminal based on a positioning information transmission request which includes information identifying the cell where the communication terminal exists and which is transmitted from the communication terminal; a positioning result information receiving step of receiving positioning result information which is information transmitted from the communication terminal and which indicates a result of the positioning calculation; and an approximate positional information updating step of updating the approximate positional information stored in the approximate positional information storage unit by approximate positional information updating unit based on the positioning result information.

Advantageous Effects of Invention

According to the present invention, a positioning support device that transmits highly-accurate approximate positional information to a communication terminal and a positioning support method by the positioning support device are provided.

BRIEF DESCRIPTION OF DRAWINGS

FIG. 4 is an example of approximate positional information stored in an approximate positional information DB;

FIG. 5 is an example of SGSN positional information stored in the approximate positional information DB;

FIG. 6 is an example of information stored in a management DB;

DESCRIPTION OF EMBODIMENTS

Figure 1:
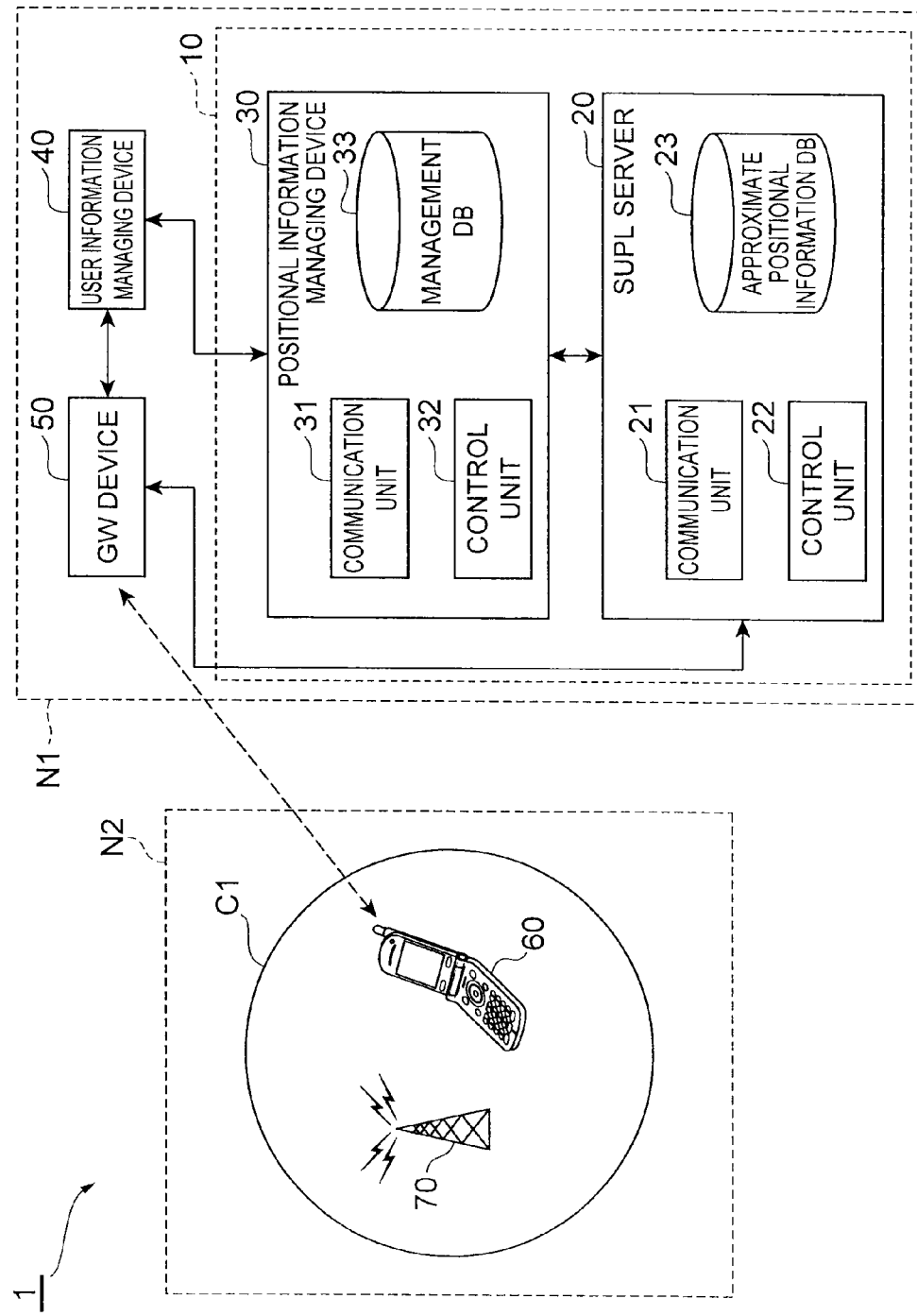
FIG. 1 is a block diagram explaining a configuration of a positioning system according to a preferred embodiment of the present invention.

Hereinafter, a best mode for carrying out the present invention will be described in detail with reference to the accompanying drawings. In the descriptions of the drawings, like elements will be denoted by like reference numerals and repetition in the descriptions will be omitted.

<Configuration of Positioning System Including Positioning Support System>

FIG. 1 is a block diagram explaining a configuration of a positioning system 1 according to a preferred embodiment of the present invention. The positioning system 1 is configured to include an SUPL (Secure User Plane Location) server 20 and a positional information managing device 30 which constitute a positioning support system 10, a user information managing device 40, a GW (Gateway) device 50, a communication terminal 60, and a base station device 70. Among these components, the positioning support system 10 constituted by the SUPL server 20 and the positional information managing device 30 is a device which supports positioning calculations by the communication terminal 60, and the user information managing device 40, the GW device 50, and the base station device 70 are respectively devices related to communication between the communication terminal 60 and the positioning support system 10. In addition, the SUPL server 20, the positional information managing device 30, the user information managing device 40, and the GW device 50 are devices included in a same mobile communication network. The communication terminal 60 is equipped with a function for connecting to the mobile communication network N1. Moreover, in the present embodiment, the communication terminal 60 is in a state where the communication terminal 60 has roamed out of the mobile communication network N1 as in a case where the communication terminal 60 is used overseas, and performs communication by connecting to the base station device 70 which is included in a mobile communication network N2 that differs from the mobile communication network N1. A case will now be described where, in this state, the communication terminal 60 performs positioning by receiving assistance data from the positioning support system 10 included in the mobile communication network N1.

A positioning method carried out by the communication terminal 60 in the present embodiment will now be described. The positioning method carried out by the communication terminal 60 in the present embodiment is GPS (Global Positioning System) positioning based on a network-assisted method. GPS positioning is a method of receiving signals from three or more GPS satellites located above a receiving terminal (the communication terminal 60) in order to determine a position (more specifically, a latitude, a longitude, and an altitude) of the communication terminal 60 based on positional information of the GPS satellites. However, in order to do so, the GPS satellites must be acquired by the communication terminal 60 in a process that requires a certain amount of time. Therefore, with GPS positioning based on the network-assisted method according to the present embodiment, a reduction in the period of time required by processing related to GPS satellite acquisition and positioning by the communication terminal 60 is achieved by transmitting information (assistance data) such as positions of the GPS satellites and an approximately positional information (initial position information) of the communication terminal 60 from the positioning support system 10 to the communication terminal. In the present embodiment, GPS positioning is performed at the communication terminal 60 and a position of the communication terminal 60 is obtained when the communication terminal 60 requests the positioning support system 10 to provide assistance data and receives, from the positioning support system 10, information indicating an approximate position of the communication terminal 60 and positional information of a GPS satellite from which the communication terminal 60 is capable of receiving signals.

For GPS satellite positional information among assistance data sent from the positioning support system 10 to the communication terminal 60, information is used which is acquired from an assistance data provider (not shown) that manages GPS satellite activation information in the positioning support system 10. Meanwhile, for the approximate positional information of the communication terminal 60, positional information of a base station device that transmits radio waves to a cell (area) in which the communication terminal 60 exists is used. This is because since the position of a base station device is determined in advance and positional information of the base station device can be stored in the positioning support system 10 in advance, when information identifying a cell in which the communication terminal 60 exists is transmitted from the communication terminal 60, transmission to the communication terminal 60 can be performed based on the information.

When the base station device is provided by the mobile communication network N1 (in other words, when the base station device is included in the mobile communication network N1), since positional information of the base station device can be readily obtained, the positional information can be readily stored as assistance data in the positioning support system 10. However, as is the case with the present embodiment, when the communication terminal 60 has roamed out, since the base station device 70 of the area in which the communication terminal 60 exists has been installed by another mobile communication network N2, it is difficult for the positioning support system 10 to obtain accurate information regarding a position where the base station device 70 is provided. Therefore, since creating approximate positional information based on information provided from the communication terminal 60 (for example, information identifying a country in which the communication terminal 60 exists and information identifying a communication service provider which provides the mobile communication network N2) significantly reduces accuracy of the approximate positional information, there is a problem in that accuracy of a result of GPS positioning performed using the information may decrease. In the following embodiment, the positioning system 1 will be described which includes the positioning support system 10 in which the accuracy of approximate positional information to be transmitted to the communication terminal 60 is increased.

Next, the respective devices included in the positioning system 1 will be described. First, the SUPL server 20 that constitutes the positioning support system 10 included in the positioning system 1 is a device which includes a primary function of the positioning support system 10 for storing assistance data to be transmitted to the communication terminal 60 and transmitting the assistance data to the communication terminal 60 based on a request from the communication terminal 60.

The positional information managing device 30 that constitutes the positioning support system 10 together with the SUPL server 20 includes a function for carrying out authentication processing for performing positioning-related communication with the communication terminal 60 and a function of a GMLC (Gateway Mobile Location Centre) that manages data related to positional information in the mobile communication network N1, and is realized as an EBSCP (External Business user Service Control Point) or the like. Specifically, profile data or the like of a communication network (including the mobile communication network N2) which differs from the network of the communication terminal (the mobile communication network N1) is stored and transmitted to the SUPL server 20 as necessary.

Detailed processing according to the present embodiment will be described later.

The user information managing device 40 includes a function for storing information (user profile) of an owner (a user) of a communication terminal that performs positioning-related communication with the positioning support system 10, and is realized as an SUSCP (Specific User Service Control Point) or the like. In addition, the information is provided in response to a request from the positional information managing device 30.

The GW device 50 is provided between a mobile communication network (for example, the mobile communication network N2) that differs from the mobile communication network N1 and a communication terminal, and is realized as a CPCG (Charging and Protocol Conversion Gateway) or the like. In order to communicate with the respective devices included in the mobile communication network N1, the communication terminal 60 having roamed out from the mobile communication network N1 must first connect to the GW device 50. The GW device 50 mediates communication between the communication terminal 60 having transmitted a connection request from an outside mobile communication network and the respective devices (in the present embodiment, the SUPL server 20) included in the mobile communication network N1.

The communication terminal 60 is used by a user and is specifically realized as a device having a communication function such as a mobile phone and a PDA (Personal Digital Assistance). In addition, the communication terminal 60 according to the present embodiment has a function for performing communication via the mobile communication network N2 by including a function related to roaming which enables communication to be performing using a facility (for example, the base station device 70) that is provided by another communication service provider. Furthermore, the communication terminal 60 has a function for performing GPS positioning using assistance data from the positioning support system 10.

The base station device 70 is a device included in the mobile communication network N2 and forms a cell C1 by transmitting radio waves over a particular range. When the communication terminal 60 is within the cell C1, the communication terminal 60 can perform communication by transmitting and receiving information via the base station device 70. Cells are respectively assigned unique cell IDs. Due to the cell ID, it is possible to distinguish which base station device 70 is related to the cell. A plurality of base station devices including the base station device 70 is managed by an SGSN (Serving GPRS Support Node) (not shown) which is located upstream of the base station device in the mobile communication network N2 and which controls packet communication.

Figure 2:
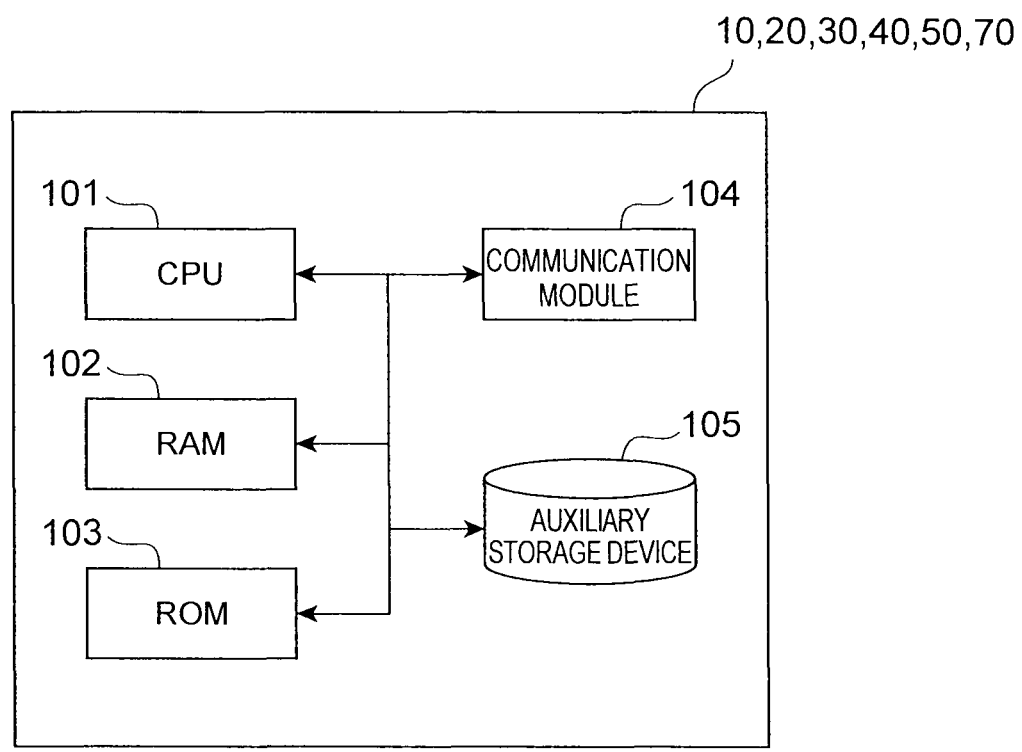
FIG. 2 is a diagram showing a hardware configuration of a SUPL server, a positional information managing device, a user information managing device, a GW device, and a base station device.
Figure 3:
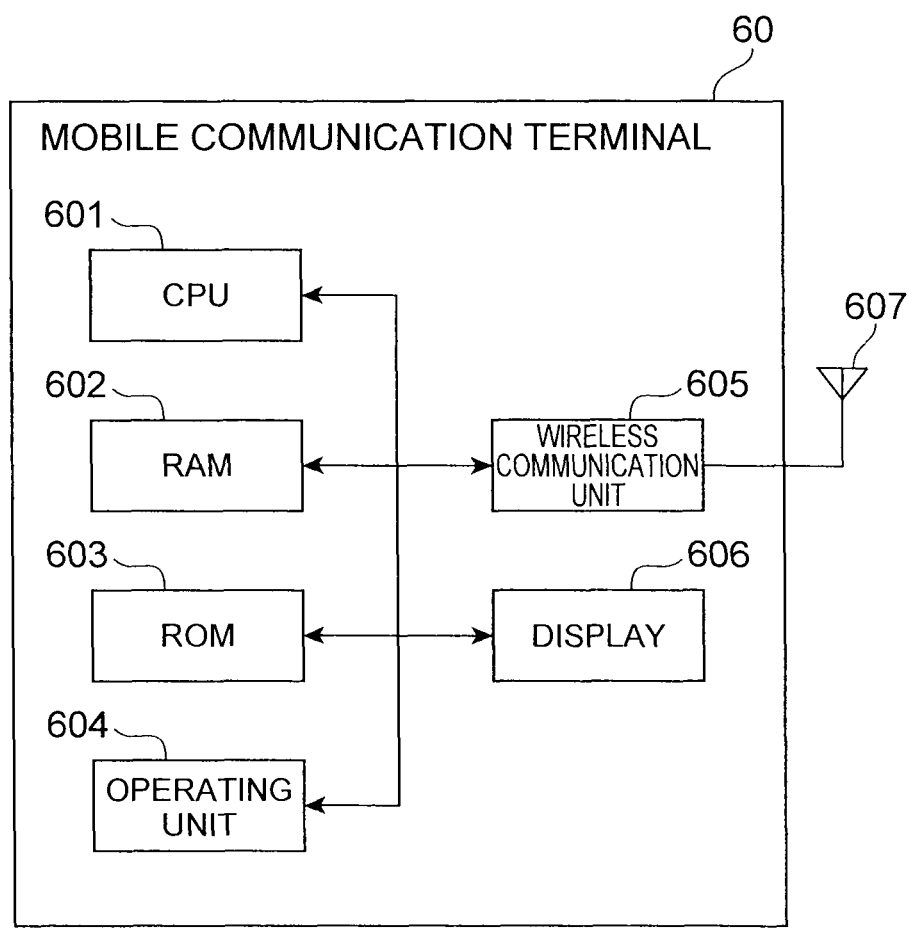
FIG. 3 is a diagram showing a hardware configuration of a communication terminal.

As shown in FIG. 2, the SUPL server 20, the positional information managing device 30, the user information managing device 40, the GW device 50, and the base station device 70 included in the positioning system 1 are respectively configured as a computer including hardware such as a CPU 101, a RAM (Random Access Memory) 102 that is a main storage device and a ROM (Read Only Memory) 103, a communication module 104 for performing communication, and an auxiliary storage device 105 that is a hard disk or the like. Functions of the respective devices are realized through operations of these components. In addition, as shown in FIG. 3, the communication terminal 60 is constituted by hardware such as a CPU (Central Processing Unit) 601, a RAM 602, a ROM 603, an operating unit 604, a wireless communication unit 605, a display 606, and an antenna 607. Functions of the communication terminal 60 are realized through operations of these components.

Moreover, the SUPL server 20 and the positional information managing device 30, the positional information managing device 30 and the user information managing device 40, the user information managing device 40 and the GW device 50, and the GW device 50 and the SUPL server 20 are respectively connected to each other via a wired network. In addition, information is respectively exchanged by wireless communication between the communication terminal 60 and the GW device 50, and the communication terminal 60 and the base station device 70.

Returning to FIG. 1, a detailed description will now be given on the SUPL server 20 and the positional information managing device 30 included in the positioning support system 10 which is a positioning support device included in the positioning system 1 and which constitutes a feature of the present invention. The SUPL server 20 is configured to include a communication unit (approximate positional information transmitting means, positioning result receiving means) 21, a control unit (approximate positional information transmitting means, approximate positional information updating means) 22, and an approximate positional information DB (database) (approximate positional information storage means) 23. In addition, the positional information managing device 30 is configured to include a communication unit 31, a control unit (approximate positional information transmitting means) 32, and a management DB 33.

The communication unit 21 of the SUPL server 20 functions as approximate positional information transmitting means which transmits assistance data including approximate positional information to the communication terminal 60 based on a positioning information transmission request transmitted from the communication terminal 60. In addition, the communication unit 21 also includes a function as positioning result receiving means that receives a positioning result transmitted from the communication terminal 60. Furthermore, the communication unit 21 also has a function for transmitting and receiving information to/from the positional information managing device 30. Information received by the communication unit 21 is sent to the control unit 22.

The control unit 22 includes a part of a function of approximate positional information transmitting means which acquires approximate positional information stored in the approximate positional information DB 23 based on a positioning information transmission request transmitted from the communication terminal 60. Moreover, for the purpose of transmitting approximate positional information with higher accuracy to the communication terminal 60, the approximate positional information that is transmitted by the control unit 22 to the communication terminal 60 is also determined based on information transmitted from the positional information managing device 30 to be described later. Specific processing thereof will be described in the description related to a positioning support method which will be given later. In addition, the control unit 22 includes a function of approximate positional information updating means which updates approximate positional information stored in the approximate positional information DB 23, to be described later, based on positioning result information which indicates a result of GPS positioning and which is transmitted from the communication terminal 60. Update information of approximate positional information by the control unit 22 will be described later.

The approximate positional information DB 23 functions as approximate positional information storage means in which information of a base station related to a cell is stored in association with a cell ID of the cell. FIG. 4 is an example of approximate positional information stored in the approximate positional information DB 23. Among the information shown in FIG. 4, an MCC (Mobile Country Code), an MNC (Mobile Network Code or operator code (for example, determined for each communication service provider), and a cell ID are determined in advance. In addition, the MCC, the MNC, and the cell ID are also included in the positioning information transmission request transmitted from the communication terminal 60 as information that identifies a cell in which the communication terminal 60 exists. Furthermore, Lat (Latitude (Y)), Lon (Longitude (X)), Alt (Altitude, a height from a WGS84 ellipsoid that is used as a standard in GPS positioning), Unc (Uncertainty (k), uncertainty of latitude and longitude), and Unc-Alt (Uncertainty Altitude (k)) indicate approximate positional information stored in association with the cell ID. The uncertainties represent an accuracy based on a calculation method of the approximate positional information, an accuracy based on a GPS positioning result using the approximate positional information, and the like. In addition, update necessity is a flag that indicates whether or not information stored in the table shown in FIG. 4 needs to be updated based on a positioning result transmitted from the communication terminal 60.

As shown in FIG. 4, the approximate positional information stored in association with the cell ID is either (1) information indicating an accurate position of a base station device related to a cell identified by the cell ID or (2) information which does not accurately indicate the position of the base station device and which is updated based on a result of positioning previously performed in the same cell. Among these information, the (1) information indicating an accurate position of the base station device can be acquired by, for example, making an inquiry to a GMLC of a communication service provider managing the base station device by specifying the cell ID corresponding to the base station device. In this case, since accurate information is already stored in the approximate positional information DB 23, the information in the approximate positional information DB 23 need not be updated further and a flag indicating "updating unnecessary" is assigned to the information.

However, since communication service providers which provide information indicating a position of a base station device as described above are limited, it is difficult for the approximate positional information DB 23 to obtain an accurate position of the base station device. Therefore, in the approximate positional information DB 23, (2) approximate positional information calculated based on approximate positional information used when positioning had been previously performed in the same cell and on a positioning result. In this manner, when an accurate position of the base station device is unknown, the control unit 22 (approximate positional information updating means) creates new approximate positional information based on a result of positioning performed in a cell identified by the cell ID and information stored in the approximate positional information DB 23 is updated. Specific methods thereof include a method in which, when the communication terminal 60 performs positioning, a point midway between a position identified by approximate positional information of a cell ID used when a transmission is performed to the communication terminal 60 in response to a request from the communication terminal and a position identified by a positioning result by the communication terminal 60 (of the same cell ID) is respectively calculated for latitude, longitude, and altitude, whereby a calculation result is set as new approximate positional information, and a method in which an average value of previous positioning results for the same cell ID is respectively calculated for latitude, longitude, and altitude, whereby a calculation result is set as new approximate positional information. As shown, when updating approximate positional information based on a positioning result by the communication terminal 60, a flag indicating "update necessary" is assigned to the approximate positional information.

Moreover, as described above, when the position of the base station device is not accurately known and positioning has not been previously performed in a cell with the same cell ID, approximate positional information associated to the cell ID is not stored in advance in the approximate positional information DB 23. In this case, positional information obtained from the MCC and the MNC transmitted from the communication terminal 60 is used as the approximate positional information to be transmitted to the communication terminal 60. This information is transmitted from the positional information managing device 30 to be described later. Processing thereof will also be described later.

FIG. 5 is also a diagram showing an example of approximate positional information of an SGSN stored in the approximate positional information DB 23. As described above, the SGSN is a device that manages a plurality of base station devices and a positioning information transmission request transmitted from the communication terminal 60 includes an SGSN IP (Internet Protocol) that specifies the SGSN managing the base station device 70 to which the communication terminal 60 is connected. Therefore, in a case where positional information of the SGSN is known even though the position of the base station device 70 is not, the information can be used as approximate positional information. The information shown in FIG. 5 is stored when transmitted from the positional information managing device 30, which will be described later, to be used for GPS positioning.

Next, returning now to FIG. 1, the positional information managing device 30 included in the positioning support system 10 will be described. The communication unit 31 of the positional information managing device 30 includes a function for performing authentication processing of the communication terminal 60 that transmits a connection request to the SUPL server 20 by communicating with the user information managing device 40 and a function for transmitting positional information (positional information identified by the MCC and MNC, positional information of the SGSN, and the like) stored by the positional information managing device 30 to the SUPL server 20 by communicating with the SUPL server 20.

The control unit 32 includes a function for performing authentication processing regarding the communication terminal 60 based on a request from the SUPL server 20 and a part of a function of approximate positional information transmitting means which determines approximate positional information to be transmitted to the communication terminal 60. Information which is included in the approximate positional information transmission request transmitted from the communication terminal 60 and which is to be transmitted from the SUPL server 20 to the positional information managing device 30 includes the MCC, the MNC, and the cell ID described above as information related to the cell in which the communication terminal 60 exists (roaming area information). The information similarly includes information identifying the SGSN (SGSN IP address) which controls the base station device 70 related to the cell in which the communication terminal 60 exists. Based on these information, the control unit 32 determines (1) whether or not information identifying an accurate position of the base station device 70 can be obtained and (2) whether or not the positional information managing device 30 holds a position of the SGSN controlling the base station device 70. Subsequently, based on the determination results, information related to determination of approximate positional information to be transmitted from the control unit 32 to the SUPL server 20 is selected and transmitted to the SUPL server 20. Moreover, details of the determination and processing based on the determination result will be described later.

The management DB 33 functions as part of approximate positional information storage means that stores information related to the approximate positional information determination to be transmitted to the communication terminal 60. An example of information stored in the management DB 33 is shown in FIG. 6. In the management DB 33, an MCC and an MNC, an IP address of a SGSN, and positional information (Lat, Lon, Alt, Unc, and Unc-Alt) are stored in association with each other. Also included is the positional information described above stored in association with the MCC and the MNC. Among information stored in the management DB 33 (the information shown in FIG. 6), the positional information stored in association with the SGSN IP address is based on information transmitted from an operator identified by the MCC and the MNC and the like, and is accurate information. In addition, when positional information of the SGSN is not disclosed such as an operator (communication service provider) identified by the MNC "ZZZ", positional information that is tentatively obtained from the MCC and the MNC (such as positional information indicating a location of a head office of the operator) is stored. In this manner, the management DB 33 stores approximate positional information that is obtained using at least a part of the MCC, the MNC, and the SGSN IP address.

Furthermore, flags indicating "viability of inquiry to GMLC" are respectively assigned to information stored in the management DB 33 in association with the MCC and the MNC. These are flags that indicate whether or not an inquiry can be made from the positional information managing device 30 to the GMLC of the operator regarding positional information of the base station device corresponding to the cell ID. When a flag indicating "inquiry enabled" is assigned to the GMLC of a specific operator, by inquiring positional information of the base station device using the cell ID from the positional information managing device 30 to the GMLC of the operator, accurate positional information of the base station device can be obtained. A viability of making an inquiry to the GMLC is determined based on, for example, a contract entered in advance between the communication service provider that provides the mobile communication network N1 and an operator of the other party. Information stored in the management DB 33 of the positional information managing device 30 is stored in advance by the communication service provider that provides the mobile communication network N1. The control unit 32 of the positional information managing device 30 determines what information is to be transmitted to the SUPL server 20 based on information stored in the management DB 33 and, based on a result thereof, appropriate information is transmitted to the SUPL server 20.

With the positioning system 1 according to the present invention, due to the respective devices functioning as described above, approximate positional information is transmitted to the communication terminal 60 in response to a request by the communication terminal 60 and approximate positional information is updated based on a GPS positioning result by the communication terminal 60.

<Positioning Method of Positioning System Including Positioning Support System (Positioning Support Method)>

Figure 7:
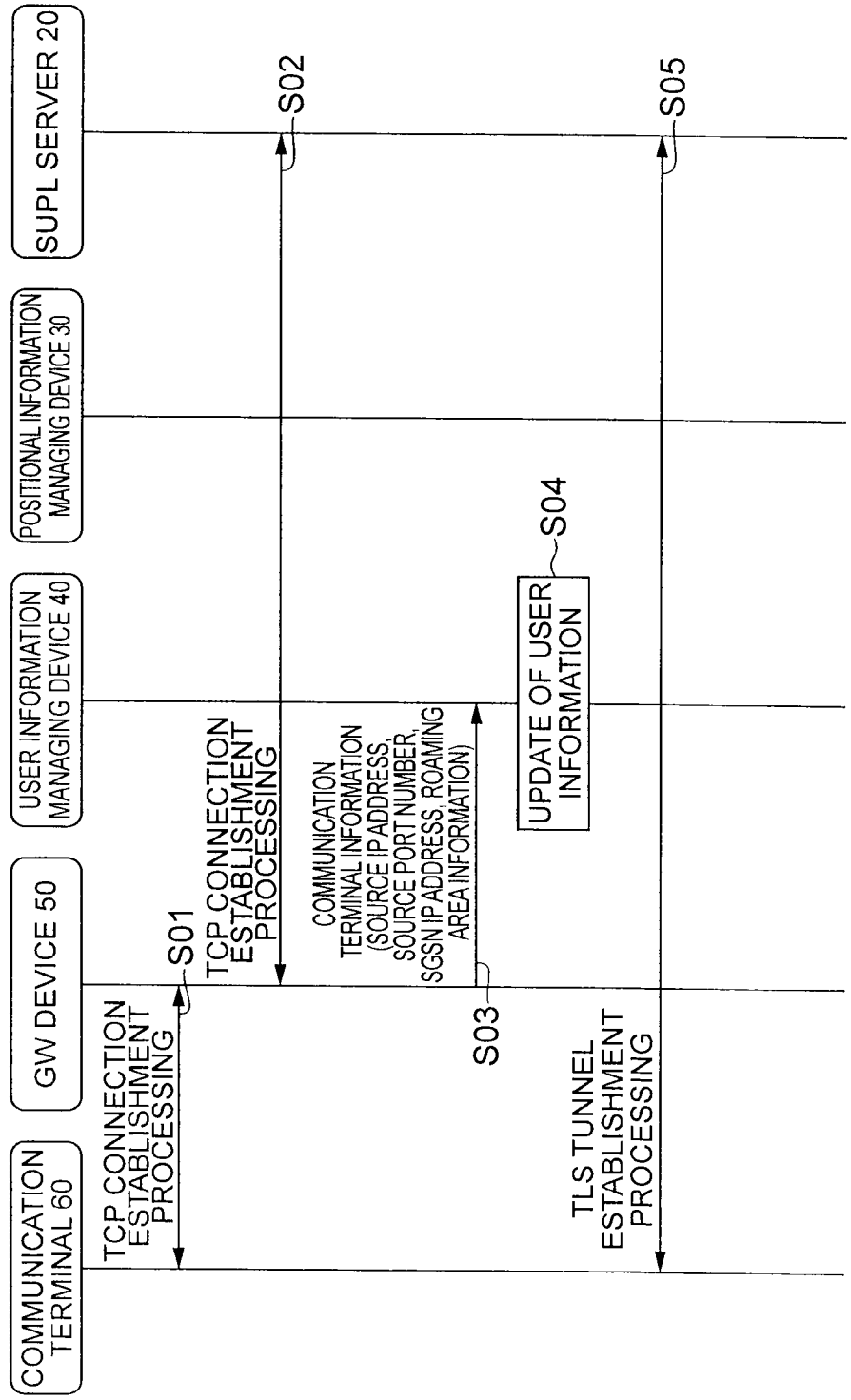
FIG. 7 is a sequence diagram explaining processing for performing communication between a communication terminal 60 and an SUPL server 20.
Figure 8:
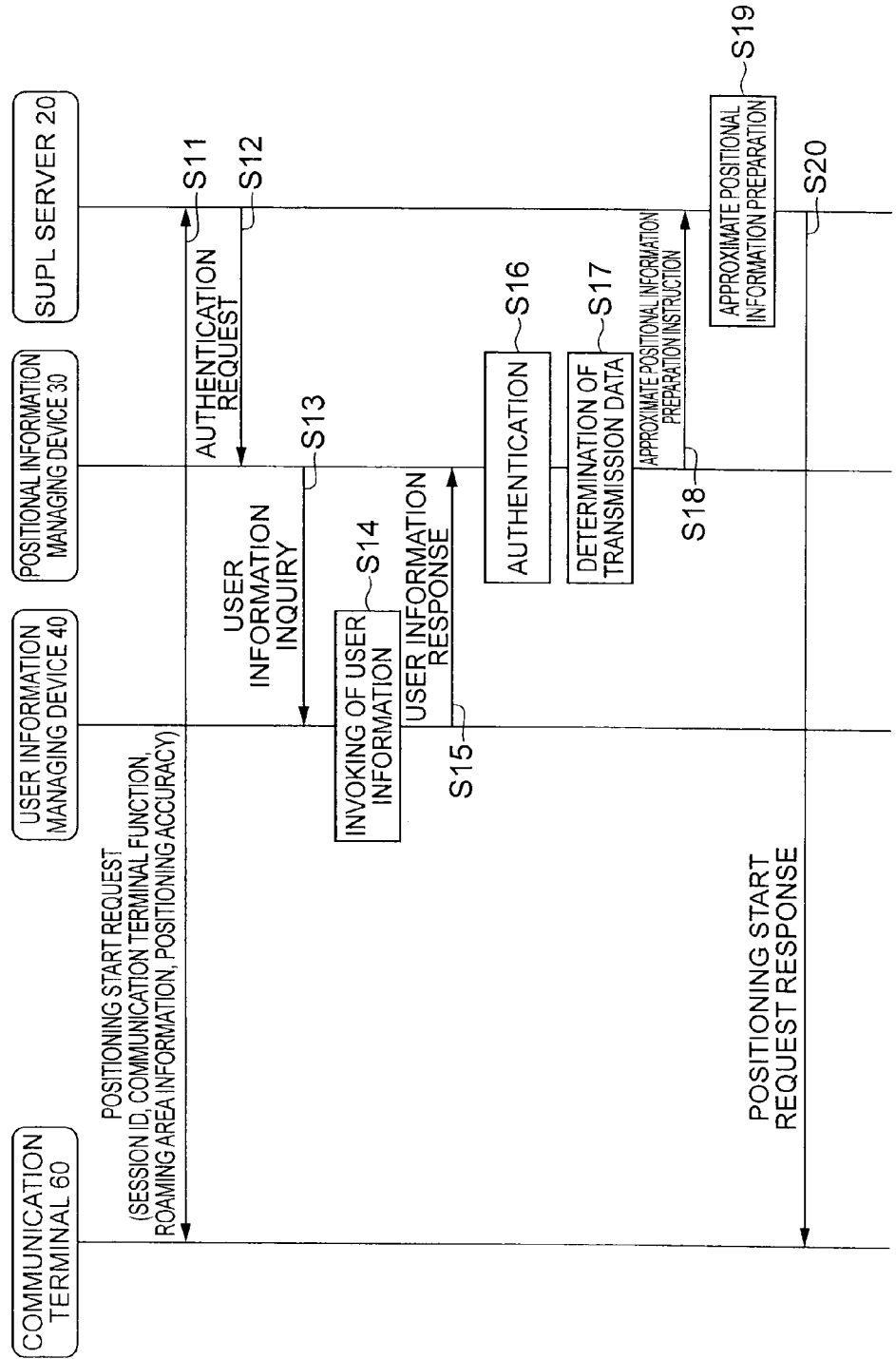
FIG. 8 is a sequence diagram explaining authentication processing of the communication terminal 60 in a mobile communication network N1 and processing related to the preparation of approximate positional information transmitted to the communication terminal 60.
Figure 9:
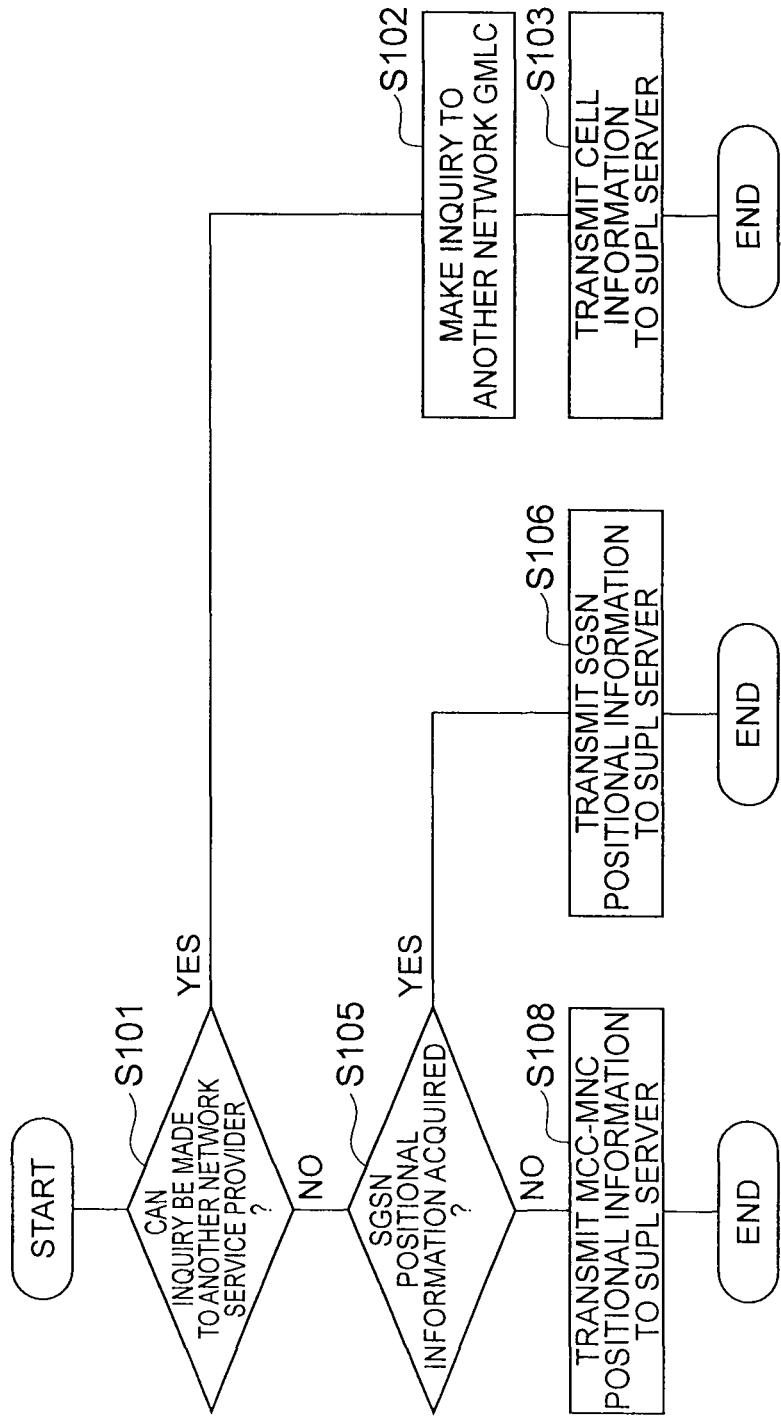
FIG. 9 is a flow chart explaining processing for determining transmission data transmitted to the SUPL server by the positional information managing device.
Figure 10:
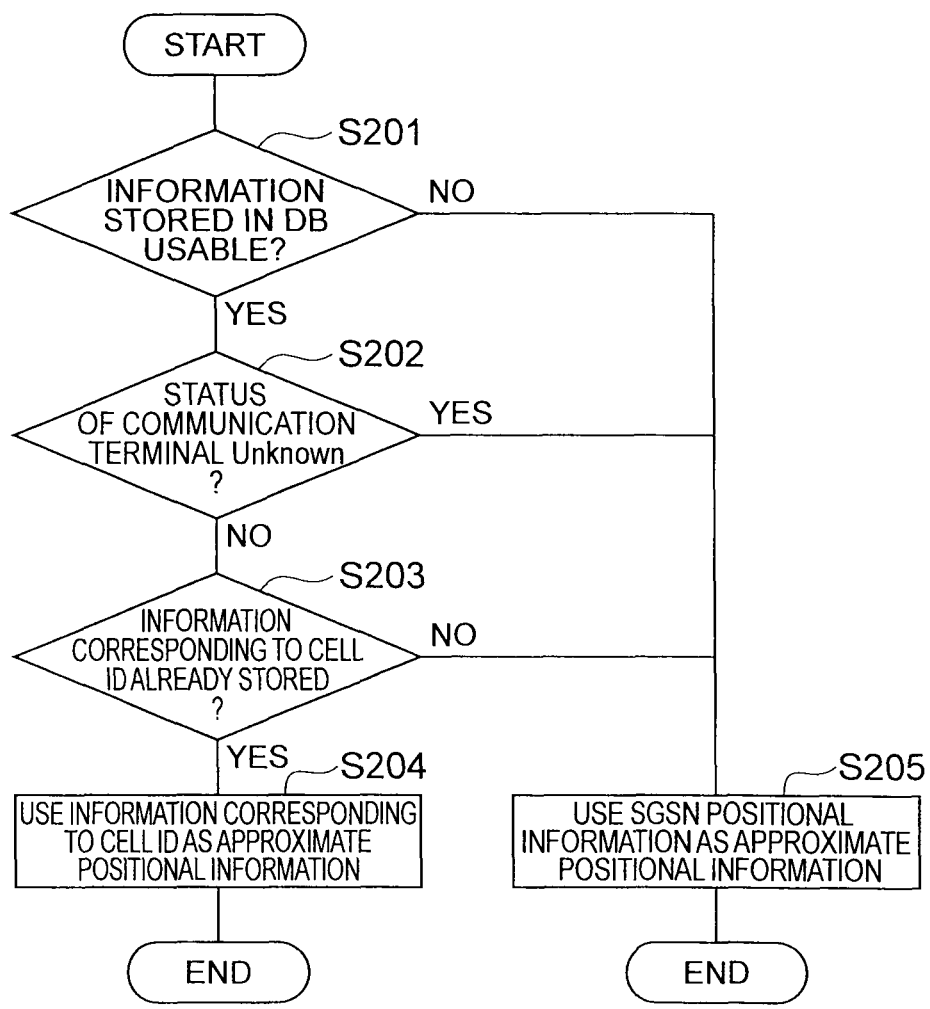
FIG. 10 is a flow chart explaining processing for determining positional information that is used as approximate positional information to be transmitted to a communication terminal from the SUPL server.
Figure 11:
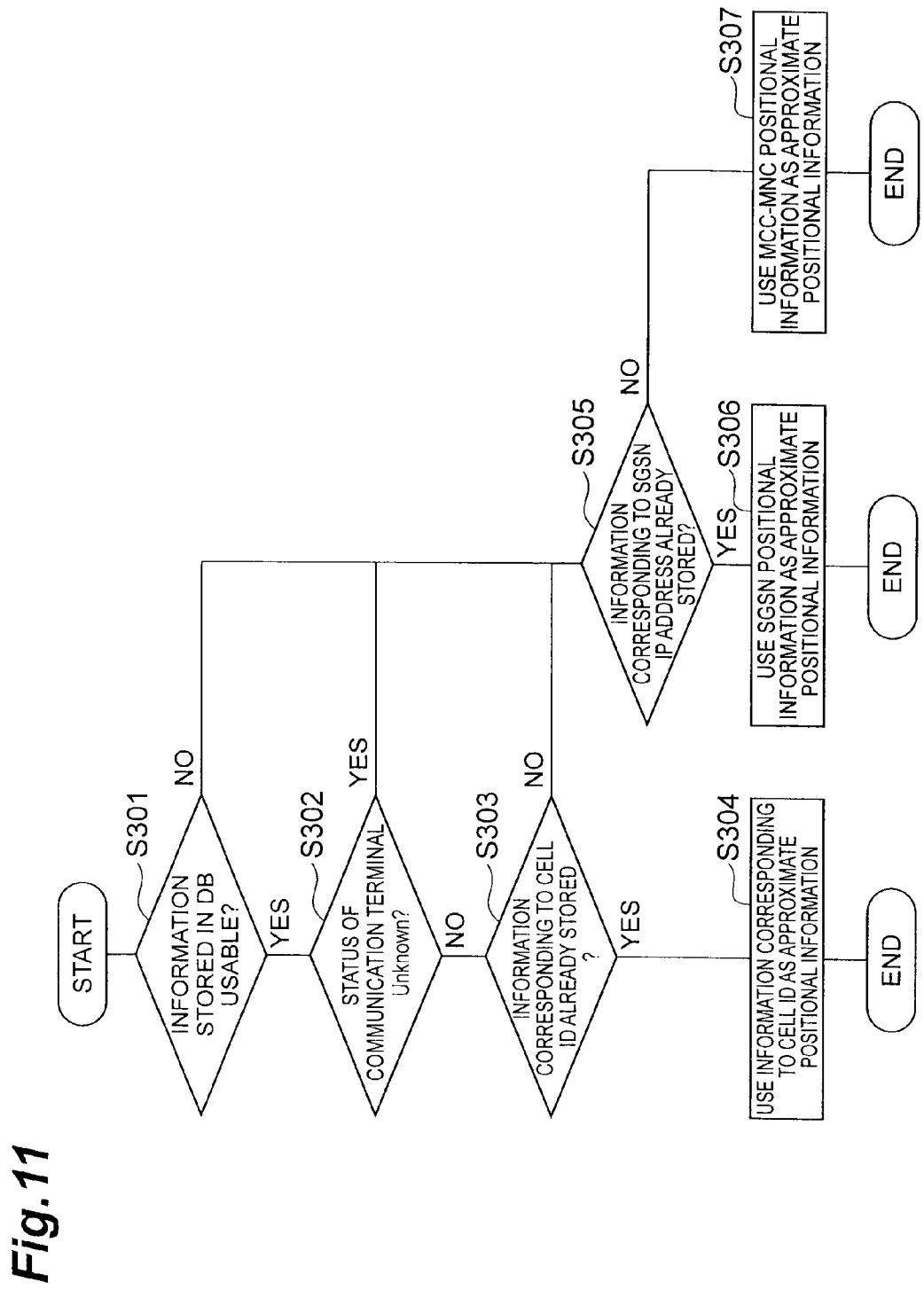
FIG. 11 is a flow chart explaining processing for determining positional information that is used as approximate positional information to be transmitted to the communication terminal from the SUPL server.
Figure 12:
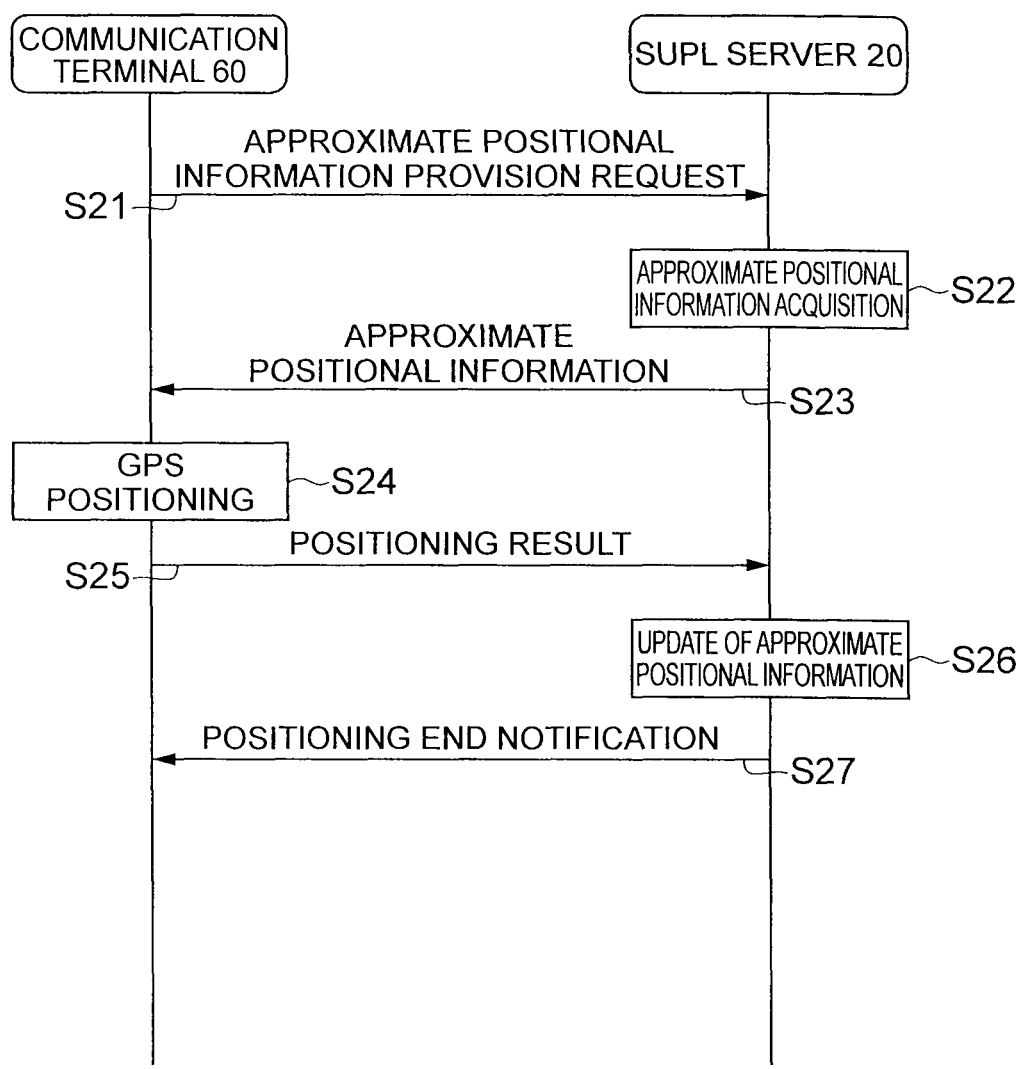
FIG. 12 is a sequence diagram explaining processing related to GPS positioning and processing after positioning at the communication terminal 60.

Next, a positioning method used by the positioning system 1 including the positioning support system 10 described above (positioning support method used by the positioning support system 10) will be described with reference to sequence diagrams shown in FIGS. 7, 8, and 12 and flow charts shown in FIGS. 9 to 11. Moreover, FIG. 7 is a sequence diagram explaining processing for performing communication between the communication terminal 60 and the SUPL server 20. In addition, FIG. 8 is a sequence diagram explaining authentication processing of the communication terminal 60 in the mobile communication network N1 and processing related to the preparation of approximate positional information transmitted to the communication terminal 60. Furthermore, FIG. 12 is a sequence diagram explaining processing related to GPS positioning and processing after positioning at the communication terminal 60. Moreover, FIGS. 9 to 11 are flow charts explaining details of the processing shown in FIG. 8.

First, processing for performing communication between the communication terminal 60 and the SUPL server 20 will be described with reference to FIG. 7. When performing GPS positioning with the communication terminal 60, a communication channel must be provided between the communication terminal 60 and the SUPL server 20 that transmits assistance data for GPS positioning to the communication terminal 60. Therefore, the communication terminal 60 transmits a connection request for providing a communication channel with the SUPL server 20 to the GW device 50 via the base station device 70. The connection request is transmitted by an operation of the communication terminal 60 performed by a user of the communication terminal 60. The GW device 50 receives the connection request, and performs TCP (Transmission Control Protocol) connection establishment processing between the communication terminal 60 and the GW device 50 (S01) as well as TCP connection establishment processing between the GW device 50 and the SUPL server 20 (S02).

In addition, when performing TCP connection establishment processing between the GW device 50 and the communication terminal 60 (S01), information related to the communication terminal 60 which is transmitted from the communication terminal 60 is forwarded to the user information managing device 40. In this case, information transmitted to the user information managing device 40 includes a source IP address and a source port number of the communication terminal 60, an SGSN IP address, and roaming area information. The information is also transmitted to the SUPL server 20 during TCP connection establishment described above. Upon receiving the information from the GW device 50, the user information managing device 40 updates user information stored in the user information managing device 40 based on the information (S04). Accordingly, roaming area information (MCC, MNC, and cell ID) related to the cell C1 in which the communication terminal 60 exists and information related to the IP address of the SGSN that controls the base station device 70 related to the cell C1 are stored in the user information managing device 40.

Next, processing is performed for establishing a TLS (Transport Layer Security) tunnel used for transmitting and receiving information related to positioning between the communication terminal 60 and the SUPL server 20 via the TCP connection created by the processing described above (S05). Due to the processing described above, a communication channel for performing communication related to positioning between the communication terminal 60 and the SUPL server 20 is provided and preparation related to transmission and reception of information ends.

Next, authentication processing related to positioning performed by the communication terminal 60 will be described with reference to FIG. 8. When a TLS tunnel is established by the processing described above (S05), a positioning start request (ULP_SUPL-START) is transmitted from the communication terminal 60 to the SUPL server 20 (S11, approximate positional information transmitting step). The positioning start request transmitted at this point from the communication terminal 60 to the SUPL server 20 includes a session ID (an identifier commonly assigned to processing related to one GPS positioning session), a function indicating a positioning capability of the communication terminal 60, roaming area information, positioning accuracy by the communication terminal 60, and a connection status of the communication terminal 60 to the cell C1. In addition, an MSISDN (Mobile Subscriber ISDN Number) of the communication terminal 60 is included as information identifying the communication terminal 60. Upon receiving the positioning start request, the communication unit 21 of the SUPL server 20 requests authentication processing (HTTP_Authentication-Request) related to the communication terminal 60 to the positional information managing device 30 (S12). The request includes the session ID, the roaming area information, the MSISDN of the communication terminal 60, a source IP address, and a source port number.

Upon receiving this request from the SUPL server 20, in order to confirm user information, the communication unit 31 of the positional information managing device 30 makes an inquiry (ISCP_Authentication-Request) for user information by transmitting the MSISDN of the communication terminal 60 to the user information managing device 40 (S13). Upon receiving the MSISDN of the communication terminal 60, the user information managing device 40 invokes user information by reading a profile of the user (S14). Information related to the user of the communication terminal 60 has been transmitted from the GW device 50 to the user information managing device 40 and updated in advance (S04). Therefore, the user information managing device 40 acquires this information (the source IP address, the source port number, the roaming area information, and the SGSN IP address) and transmits the information to the positional information managing device 30 as a user information response (ISCP_Authentication-Response) (S15). Upon receiving the information transmitted from the user information managing device 40, the positional information managing device 30 transmits the information from the communication unit 31 to the control unit 32 together with information transmitted earlier from the SUPL server 20. By having the control unit 32 confirm whether the two pieces of information are consistent with each other, a determination is made on whether communication between the communication terminal 60 and the SUPL server 20 can be continued (S16). If the pieces of information are not consistent with each other, a determination that communication with the communication terminal 60 cannot be continued is made and connection is broken. Moreover, if it is determined that communication can be continued, a transition is made to processing related to approximate positional information transmission.

As processing related to the determination of information to be sent as approximate positional information to the communication terminal 60, first, the control unit 32 determines information to be transmitted (determination of transmission data) from the positional information managing device 30 to the SUPL server 20 (S17, approximate positional information transmitting step). By transmitting the determined transmission data from the communication unit 31 to the SUPL server 20, an instruction to the effect that authentication processing has ended and that preparation related to output of approximate positional information (HTTP_Authentication-Response) is issued (S18, approximate positional information transmitting step). The instruction transmitted from the positional information managing device 30 to the SUPL server 20 includes a session ID, an authentication result, positional information acquired by the positional information managing device 30 and a level of the positional information (details will be described later), roaming area information, and an SGSN IP address.

Processing performed by the control unit 32 of the positional information managing device 30 will now be described with reference to the flow chart shown in FIG. 9. The control unit 32 determines whether or not "an inquiry can be made to another network service provider" based on roaming area information among information transmitted from the communication terminal 60 to the SUPL server 20 and on information stored in the management DB 33 (S101). This is determined based on whether or not an "inquiry can be made to GMLC" flag is set to an operator identified by an MCC and an MNC included in roaming area information among information stored in the management DB 33. At this point, when it is determined that an inquiry can be made to the GMLC, by requesting (Lr-IF SRLIR) provision of positional information using a cell ID to the GMLC of the operator from the communication unit 31 of the positional information managing device 30, positional information of the base station device 70 identified by the cell ID is acquired (Lr-IF SRLIA) (S102). Subsequently, a determination is made to use the acquired positional information of the base station device 70 as the transmission data and the transmission data is sent from the communication unit 31 to the SUPL server 20 (S103 (S18)). At this point, with respect to the transmission data to be transmitted from the communication unit 31 to the SUPL server 20, information indicating that the transmission data had been acquired by inquiry made to a GMLC of another network (the mobile communication network N2) is transmitted in association with the transmission data.

Moreover, when transmitting the positional information of the base station device 70 as transmission data from the positional information managing device 30 to the SUPL server 20, a flag indicating that "information stored in the approximate positional information DB 23 should not be used as approximate positional information" and a flag indicating that "the approximate positional information DB 23 should not be updated based on a positioning result transmitted from the communication terminal 60" are assigned in association with the information. Because information on the base station device 70 that is acquired by making an inquiry to the GMLC is most accurate, this is done in order to instruct that the information is to be used with highest priority as approximate positional information and to prohibit a result of positioning performed by the communication terminal 60 using the positional information of the base station device 70 from being used to update approximate positional information that is stored in the approximate positional information DB 23.

On the other hand, if the flag indicating that "inquiry to GMLC not allowed" is assigned, since accurate positional information of the base station device 70 corresponding to the cell ID cannot be acquired, whether or not positional information of the SGSN that controls the base station device 70 is stored in the management DB 33 is confirmed (S105). In this case, when positional information of the SGSN is stored in the management DB 33, a determination is made to use the positional information as the transmission data and the transmission data is sent from the communication unit 31 to the SUPL server 20 (S106 (S18)). At this point, with respect to the transmission data to be transmitted from the communication unit 31 to the SUPL server 20, information indicating that the transmission data is positional information of the SGSN stored in the management DB 33 is transmitted in association with the transmission data.

In addition, when positional information of the SGSN is not stored in the management DB 33, a determination is made to use positional information derived from the MCC and the MNC as the transmission data and the transmission data is sent from the communication unit 31 to the SUPL server 20 (S108 (S18)). At this point, with respect to the transmission data to be transmitted from the communication unit 31 to the SUPL server 20, information indicating that the transmission data is positional information derived from the MCC and the MNC stored in the management DB 33 is transmitted in association with the transmission data. Consequently, transmission data is transmitted from the positional information managing device 30 to the SUPL server 20 and preparation of approximate positional information is instructed.

On the other hand, when an instruction related to preparation of approximate positional information is received together with transmission data at the communication unit 21 of the SUPL server 20, the information is sent to the control unit 22 and processing related to preparation of approximate positional information to be notified to the communication terminal 60 is performed (S19, approximate positional information transmitting step).

First, from information attached to the transmission data, the control unit 22 confirms if the transmission data transmitted from the positional information managing device 30 is any of (1) positional information of the base station device 70, (2) positional information of the SGSN, and (3) information calculated by MCC–MCN. Subsequently, processing corresponding to this result is performed at the control unit 22.

First, when the transmission data is (1) positional information of the base station device 70, the control unit 22 determines that the positional information of the base station device 70 is to be transmitted to the communication terminal 60 as approximate positional information. In addition, the positional information of the base station device 70 transmitted from the positional information managing device 30 is stored in the approximate positional information DB 23 in association with the cell ID. An "update not required" flag is assigned to information stored in the approximate positional information DB 23 at this point since the information is most accurate as approximate positional information.

Next, when the transmission data is (2) positional information of an SGSN, approximate positional information to be notified to the communication terminal 60 is determined according to the flow chart shown in FIG. 10. First, the control unit 22 determines whether or not information stored in the approximate positional information DB 23 is usable (S201). For example, if the approximate positional information DB 23 is cut off from the network for some reason, information stored in the approximate positional information DB 23 cannot be used. In this manner, a determination is made on whether not information stored in the approximate positional information DB 23 in association to a cell ID can be used.

At this point, when it is determined that the information stored in the approximate positional information DB 23 is usable, a status of the communication terminal 60 is next confirmed (S202). The status of the communication terminal 60 that is confirmed at this point refers to information confirming whether the communication terminal 60 exists in an area of the cell C1 and is information indicating a connection state to the cell C1 that is notified from the communication terminal 60 at the time of a positioning start request (ULP_SUPL-START). A case where the status is "Unknown" refers to a case where it is unclear whether or not the communication terminal 60 continues to exist in the cell C1 (there is a possibility that the communication terminal 60 does not exist in the cell C1), whereby use of information stored in the approximate positional information DB 23 is suppressed. In addition, when the status is not "Unknown" or, in other words, when the communication terminal 60 conceivably continues to exist in the cell C1, confirmation is performed on whether or not information corresponding to the cell ID has already been stored (S203).

In this case, for example, when a current GPS positioning session by the communication terminal 60 is a first GPS positioning session in the cell C1, since approximate positional information associated with the cell ID of the cell C1 has not yet been stored in the approximate positional information DB 23, information stored in the approximate positional information DB 23 cannot be used. Conversely, when GPS positioning by the communication terminal has been previously performed in the cell C1, since approximate positional information updated based on a result of the GPS positioning is stored in the approximate positional information DB 23, a determination is made to use the approximate positional information stored in the approximate positional information DB 23 (S204). Moreover, when it is determined that a problem exists in any of the confirmations described above (in other words, when it is determined that information stored in the approximate positional information DB 23 is unusable, when the status of the communication terminal 60 is "Unknown", and when information corresponding to the cell ID is not stored in the approximate positional information DB 23), a determination is made to use positional information of the SGSN transmitted from the positional information managing device 30 as the approximate positional information, and preparation thereof is performed (S205).

Next, when the transmission data is (3) information calculated by MCC–MNC, approximate positional information to be notified to the communication terminal 60 is determined according to the flow chart shown in FIG. 11. First, the control unit 22 determines whether or not information stored in the approximate positional information DB 23 is usable (S301). At this point, when it is determined that the information stored in the approximate positional information DB 23 is usable, a status of the communication terminal 60 is next confirmed (S302). When the status is not "Unknown" or, in other words, when the communication terminal 60 conceivably continues to exist in the cell C1, confirmation is performed on whether or not information corresponding to the cell ID has already been stored (S303). At this point, when GPS positioning by the communication terminal has been previously performed in the cell C1, since approximate positional information updated based on a result of the GPS positioning is stored in the approximate positional information DB 23, a determination is made to use the approximate positional information stored in the approximate positional information DB 23 (S304). The processing described above is performed in the same manner as when (2) the positional information of the SGSN is transmitted from the positional information managing device 30.

On the other hand, when it is determined that a problem exists in any of the confirmations described above (in other words, when it is determined that information stored in the approximate positional information DB 23 is unusable, when the status of the communication terminal 60 is "Unknown", and when information corresponding to the cell ID is not stored in the approximate positional information DB 23), confirmation is performed on whether or not positional information of the SGSN is stored in the approximate positional information DB 23 (S305). In other words, confirmation on whether positional information associated with the IP address of the SGSN transmitted from the communication terminal 60 is stored in the table shown in FIG. 5 is performed by the control unit 22. At this point, if positional information of the SGSN is stored in the approximate positional information DB 23, since the positional information is conceivably more accurate than information calculated by MCC–MNC, a determination is made to use the positional information as approximate positional information and preparation for notifying the positional information to the communication terminal 60 is performed (S306). However, if positional information of the SGSN is not stored in the approximate positional information DB 23, a determination is made to use information calculated by MCC–MNC transmitted from the positional information managing device 30 as approximate positional information and preparation for notifying the information to the communication terminal 60 is performed (S307).

According to the processing described above, after preparation of approximate positional information to be transmitted to the communication terminal 60 by the control unit 22 of the SUPL server is performed (S19), a positioning start response (ULP_SUPL-RESPONSE) to the positioning start request (S11) is transmitted from the communication unit 21 to the communication terminal 60 (S20). The positioning start response at this point includes a session ID and information indicating a positioning method ("SET-Based-A-GPS" that identifies the network-assisted method).

Next, processing related to GPS positioning performed by the communication terminal 60 and processing after positioning will be described with reference to FIG. 12. Based on the positioning method (the network-assisted method) specified in the positioning start response (S20) from the SUPL server 20, the communication terminal 60 transmits a provision request (ULP_SUPL-POS-INT) for assistance data including approximate positional information to the SUPL server 20 (S21). The provision request includes a session ID, roaming area information, and information on a positioning capability (capability related to a function used when performing positioning according to the network-assisted method) of the communication terminal 60.

Upon receiving the approximate positional information provision request from the communication terminal 60, the communication unit 21 of the SUPL server 20 acquires approximate positional information which is notified to the control unit 22 and which is transmitted by the control unit 22 to the communication terminal 60 (S22, approximate positional information transmitting step). At this point, processing is performed for transmitting, to the communication terminal 60, information to be transmitted to the communication terminal 60 as determined in the notification information output preparation (S19) (more specifically, processing for storing the information in an SUPL_POS message). In addition, a response including GPS satellite orbit information acquired by separate processing from the processing described above as well as approximate positional information (ULP_SUPL-POS (RRLP_Measure-Position-Request)) is transmitted to the communication terminal 60 (S23, approximate positional information transmitting step). At this point, a session ID, and approximate positional information (latitude, longitude, altitude, uncertainty of latitude and longitude, and uncertainty of altitude) and GPS satellite orbit information (ephemeris, almanac) as assistance data are transmitted to the communication terminal 60.

Subsequently, GPS positioning is performed at the communication terminal 60 based on the information (S24), and computation is performed by the communication terminal 60 to calculate a position of the communication terminal 60. Positioning result information (ULP_SUPL-POS (RRLP_Measure-Position-Response)) is transmitted from the communication terminal 60 to the SUPL server 20 and received by the communication unit 21 of the SUPL server 20 (S25, positioning result receiving step). The positioning result information transmitted at this point from the communication terminal 60 to the SUPL server 20 includes a session ID and a positioning result (latitude, longitude, altitude, and circular error probability).

Next, at the SUPL server 20, the control unit 22 updates the approximate positional information stored in the approximate positional information DB 23 based on a positioning result transmitted from the communication terminal 60 (S26, approximate positional information updating step). In this case, when approximate positional information associated with a cell ID has not yet been stored in the approximate positional information DB 23, the positioning result by the communication terminal 60 is newly stored as approximate positional information. In addition, when transmitting approximate positional information stored in the approximate positional information DB 23 to the communication terminal 60, the approximate positional information is updated based on the approximate positional information transmitted to the communication terminal 60 and on a result transmitted from the communication terminal 60 after positioning.

Subsequently, a notification (ULP_SUPL-END) to the effect that the series of processing related to positioning has ended is transmitted from the communication unit 21 of the SUPL server 2- to the communication terminal 60 (S27) to end processing related to positioning by the communication terminal 60.

Moreover, in a case where GPS positioning cannot be performed due to inappropriate assistance data or the like when the communication terminal 60 attempts to perform GPS positioning (S24), an additional request for assistance data may be transmitted to the SUPL server 20 to receive new assistance data in order to reattempt GPS positioning. In addition, when positioning fails due to an inability to favorably receive a signal from a GPS satellite or the like, the processing related to positioning may be ended by notifying the communication terminal 60 that positioning has failed.

<Advantages of Positioning Support System and Positioning Support Method>

According to the positioning support system 10 and the positioning method (positioning support method) by the positioning system 1 including the positioning support system 10, the SUPL server 20 receives positioning result information transmitted from the communication terminal 60, and based on the positioning result information, approximate positional information stored in association with a cell ID is updated in the approximate positional information DB 23. In this manner, since an accuracy of approximate positional information can be increased by updating approximate positional information stored in the approximate positional information DB 23 based on an actual positioning result by the communication terminal on the same cell, approximate positional information with higher accuracy can be transmitted to the communication terminal 60 when the communication terminal 60 performs GPS positioning.

In addition, as in the embodiment described above, when a mode is adopted in which positioning result information transmitted from the communication terminal 60 to which the approximate positional information had been transmitted is received, a result of positioning performed using approximate positional information transmitted to the communication terminal 60 is reflected onto the updated approximate positional information. Therefore, the accuracy of the approximate positional information stored in the approximate positional information DB 23 can be maintained more appropriately.

Furthermore, in the embodiment described above, since new approximate positional information is calculated based on a position identified by the approximate positional information transmitted to the communication terminal 60 and on a position identified by the positioning result information, approximate positional information stored in the approximate positional information DB 23 can be updated to information that is more appropriate and highly accurate.

In particular, when a point midway between the position identified by the approximate positional information transmitted to the communication terminal 60 and the position identified by the positioning result information is set as new approximate positional information, the amount of processing related to calculating the new approximate positional information is small. Therefore, positioning can be performed at high accuracy and, at the same time, a load on the SUPL server 20 related to positioning can be reduced. As a result, the period of time required for processing can be reduced.

Moreover, when approximate positional information stored in the approximate positional information DB 23 is accurate information obtained by, for example, making an inquiry to a GMLC of the mobile communication network N2, updating of approximate positional information can be prevented from reducing accuracy of the approximate positional information by associating a "flag indicating update necessity", which enables a flag prohibiting updating based on a positioning result by the communication terminal 60 to be assigned, with the approximate positional information and storing the same.

While a favorable embodiment of the present invention has been described above, various changes can be made to the positioning system 1 including the positioning support system 10 according to the present invention. For example, a configuration may be adopted in which functions of the SUPL server 20 and the positional information managing device 30 included in the positioning support system 10 are all included in a single device. Alternatively, a configuration may be adopted in which various functions are respectively distributed over different devices. In addition, in the embodiment above, a case of performing positioning calculation processing has been described in which assistance data is acquired from the SUPL server 20 by the communication terminal 60 to perform GPS positioning and a current position of the communication terminal 60 is calculated from the positioning data. Alternatively, a mode may be adopted in which positioning calculation processing for calculating a current position of the communication terminal 60 is performed by a device other than the communication terminal 60.

Furthermore, in the embodiment above, a state where the communication terminal 60 has roamed out from the mobile communication network N1 has been described such as a case where the communication terminal 60 is used overseas. However, the positioning support system 10 and the positioning support method according to the present invention can also be applied to cases where the communication terminal 60 has not roamed out. In other words, the positioning support method according to the present embodiment can be suitably used when positional information of a base station device to which the communication terminal 60 is connected cannot be accurately obtained.

In addition, an updating method used when updating approximate positional information based on a positioning result from the communication terminal 60 is not limited to the method described in the above embodiment (a method in which a point midway between a position based on approximate positional information transmitted to the communication terminal 60 and a position based on positioning result information from the communication terminal 60 is set as new approximate positional information, or a method in which an average value of previous positioning results in the same cell is set as new approximate positional information), and various methods can be used. In this case, for example, a method of updating approximate positional information through further use of a success rate of GPS positioning or the like can be used. Specific methods of using a success rate of GPS positioning include a method in which, when a success rate of GPS positioning of a cell having a specific cell ID becomes lower than a given threshold, approximate positional information used for GPS positioning of the cell ID is once deleted.

Furthermore, while a mode in which approximate positional information stored in the approximate positional information DB 23 is updated based on positioning result information from the communication terminal 60 that had transmitted the approximate positional information has been described in the above embodiment, updating of approximate positional information need not necessarily only use a positioning result of a communication terminal that has transmitted the approximate positional information. Alternatively, information stored in the approximate positional information DB 23 may be updated also based on positioning result information of positioning performed without transmitting approximate positional information (for example, using a single point positioning method).

Moreover, while a mode is described in the above embodiment in which the communication terminal 60 performs GPS positioning using assistance data transmitted from the SUPL server 20, when GPS positioning using assistance data is not successful, GPS positioning can be continued by aborting the use of assistance data by the communication terminal 60 or using assistance data independently generated by the communication terminal 60. In this case, further improvement in the accuracy of approximate positional information can be achieved by adopting a mode in which a notification of positioning result information by the communication terminal 60 to the SUPL server 20 also notifies which assistance data has been used to perform GPS positioning.

REFERENCE SIGNS LIST

1 positioning system
10 positioning support system
20 SUPL server
30 positional information managing device
40 user information managing device
50 GW device
60 communication terminal
70 base station device

The invention claimed is:
1. A positioning support system comprising:
a processor including
an approximate positional information storage unit that stores approximate positional information is used to calculate a position of a communication terminal, the approximate positional information indicating a position of a cell where the communication terminal is located and including information identifying the cell associated with, the approximate positional information;

an approximate positional information transmitting unit to acquire, based on a positioning information transmission request including the information identifying the cell and which is transmitted from the communication terminal, the approximate positional information associated with the information identifying the cell from the approximate positional information storage unit, the approximate positional information transmitting unit transmitting the approximate positional information to the communication terminal;

a positioning result receiving unit to receive positioning result information transmitted from the communication terminal indicating a result of the positioning calculation; and an approximate positional information updating unit to update the approximate positional information stored in the approximate positional information storage unit based on the positioning result information wherein the cell corresponds to a network different from a network that includes the positioning support system, and the approximate positional information stored in the approximate positional information storage unit was previously determined in a previous positioning determination of the cell.

2. The positioning support system according to claim 1, wherein the positioning result receiving unit receives the positioning result information transmitted from the communication terminal to which the approximate positional information has been transmitted from the approximate positional information transmitting unit.

3. The positioning support system according to claim 1, wherein the approximate positional information is information identifying a position of a base station related to the cell, and the approximate positional information and the positioning result information are information including latitude and longitude.

4. The positioning support system according to claim 1, wherein the approximate positional information updating unit calculates new approximate positional information based on a position identified by the approximate positional information transmitted to the communication terminal and on a position identified by the positioning result information.

5. The positioning support system according to claim 4, wherein the approximate positional information updating unit sets a point midway between the position identified by the approximate positional information transmitted to the communication terminal and the position identified by the positioning result information as new approximate positional information.

6. The positioning support system according to claim 1, wherein the approximate positional information storage unit stores, in association with the approximate positional information, a flag indicating an update necessity of the approximate positional information, and the approximate positional information updating unit updates the approximate positional information when determination is made that the updating of the approximate positional information is necessary based on the flag.

7. A positioning support method employed by a positioning support device including approximate positional information storage unit to store approximate positional information used for positioning calculation of a communication terminal and which indicates a position of a cell where the communication terminal is located and information identifying the cell associated with the approximate positional information, the positioning support method comprising:

acquiring, in a processor, the approximate positional information stored in the approximate positional information storage unit in association with information identifying the cell where the communication terminal is located;

transmitting, under control of the processor, the approximate positional information via an approximate positional information transmitting unit to the communication terminal based on a positioning information transmission request from the communication terminal which includes information identifying the cell;

receiving, at the processor, positioning result information transmitted from the communication terminal and which indicates a result of the positioning calculation; and updating, under control of the processor, the approximate positional information stored in the approximate positional information storage unit by approximate positional information updating unit based on the positioning result information.

8. The positioning support system according to claim 1, wherein the network to which the cell corresponds and the network including the positioning support system are in different geographical areas.

* * * * *